United States Patent
Prakasam et al.

(10) Patent No.: US 12,262,341 B2
(45) Date of Patent: Mar. 25, 2025

(54) UE-PREFERRED NETWORK SLICE MANAGEMENT

(71) Applicant: Apple Inc., Cupertino, CA (US)

(72) Inventors: Sridhar Prakasam, Fremont, CA (US); Anikethan Ramakrishna Vijaya Kumar, Mysuru (IN); Krisztian Kiss, Rancho Santa Fe, CA (US); Nirlesh Koshta, Bangalore (IN)

(73) Assignee: Apple Inc., Cupertino, CA (US)

( * ) Notice: Subject to any disclaimer, the term of this patent is extended or adjusted under 35 U.S.C. 154(b) by 280 days.

(21) Appl. No.: 17/930,577

(22) Filed: Sep. 8, 2022

(65) Prior Publication Data
US 2023/0094999 A1    Mar. 30, 2023

(30) Foreign Application Priority Data
Sep. 24, 2021   (IN) .............................. 202141043422

(51) Int. Cl.
*H04W 60/00* (2009.01)
*H04W 48/16* (2009.01)
*H04W 48/18* (2009.01)
*H04W 84/04* (2009.01)

(52) U.S. Cl.
CPC ............ *H04W 60/00* (2013.01); *H04W 48/16* (2013.01); *H04W 48/18* (2013.01); *H04W 84/042* (2013.01)

(58) Field of Classification Search
CPC ..... H04W 60/00; H04W 48/16; H04W 48/18; H04W 84/042
USPC ..................................................... 455/435.1
See application file for complete search history.

(56) References Cited

U.S. PATENT DOCUMENTS

| | | | | |
|---|---|---|---|---|
| 12,120,547 | B2* | 10/2024 | Breuer | H04W 48/18 |
| 2021/0068044 | A1* | 3/2021 | Chan | H04W 48/18 |
| 2021/0282084 | A1 | 9/2021 | Catovic et al. | |
| 2022/0369215 | A1* | 11/2022 | Dees | H04W 76/14 |
| 2023/0146162 | A1* | 5/2023 | Chun | H04W 60/00 |
| | | | | 455/435.2 |

OTHER PUBLICATIONS

"3GPP; Technical Specification Group Services and System Aspects; Study on enhancement of network slicing; Phase 2 (Release 17)", 3GPP TR 23.700-40 v1.3.0, Mar. 16, 2021, 226 sheets.
ZTE et al., "New SIS: New SID on Network Slicing Phase 3", 3GPP TSG SA Meeting #93e, SP-211122, Sep. 18, 2021, 5 sheets.
3GPP; Technical Specification Group RAN; NR; Study on enhancement of Radio Access Network (RAN) slicing (Release 17), 3GPP TR 38.832 v17.0.0, Jul. 9, 2021, 31 sheets.

* cited by examiner

*Primary Examiner* — Don N Vo
(74) *Attorney, Agent, or Firm* — Fay Kaplun & Marcin, LLP

(57) ABSTRACT

A user equipment (UE) is configured to transmit a registration request to a first base station of a cellular wireless network, wherein the first base station operates on a first frequency band, the registration request including a first indication of one or more preferred network slices and receive a registration response from the first base station, the registration response including (i) a second indication of whether the one or more preferred network slices are accessible on the first frequency band and (ii) a third indication of where the UE can access any unsupported one or ones of the one or more preferred network slices.

19 Claims, 14 Drawing Sheets

UE-PREFERRED NETWORK SLICE MANAGEMENT

BACKGROUND

A network may deploy multiple network slices. Generally, a network slice refers to an end-to-end logical network that is configured to provide a particular service and/or possess particular network characteristics. Each network slice may be isolated from one another but run on a shared network infrastructure. Thus, each network slice may share network resources but facilitate different functionality.

SUMMARY

Some exemplary embodiments are related to a processor of a user equipment (UE) configured to perform operations. The operations include transmitting a registration request to a first base station of a cellular wireless network, wherein the first base station operates on a first frequency band, the registration request including a first indication of one or more preferred network slices and receiving a registration response from the first base station, the registration response including (i) a second indication of whether the one or more preferred network slices are accessible on the first frequency band and (ii) a third indication of where the UE can access any unsupported one or ones of the one or more preferred network slices.

Other exemplary embodiments are related to a user equipment (UE) having a transceiver configured to communicate with cellular wireless network and a processor communicatively coupled to the transceiver and configured to perform operations. The operations include transmitting a registration request to a first base station of a cellular wireless network, wherein the first base station operates on a first frequency band, the registration request including a first indication of one or more preferred network slices and receiving a registration response from the first base station, the registration response including (i) a second indication of whether the one or more preferred network slices are accessible on the first frequency band and (ii) a third indication of where the UE can access any unsupported one or ones of the one or more preferred network slices.

Still further exemplary embodiments are related to a network function configured to perform operations. The operations include receiving a registration request, from a user equipment (UE), comprising a first indication of one or more preferred network slices on a first frequency band and sending a registration response including (i) a second indication of whether the one or more preferred network slices are accessible on the first frequency band and (ii) a third indication of where the UE can access any unsupported one or ones of the one or more preferred network slices.

DETAILED DESCRIPTION

Figure 1:
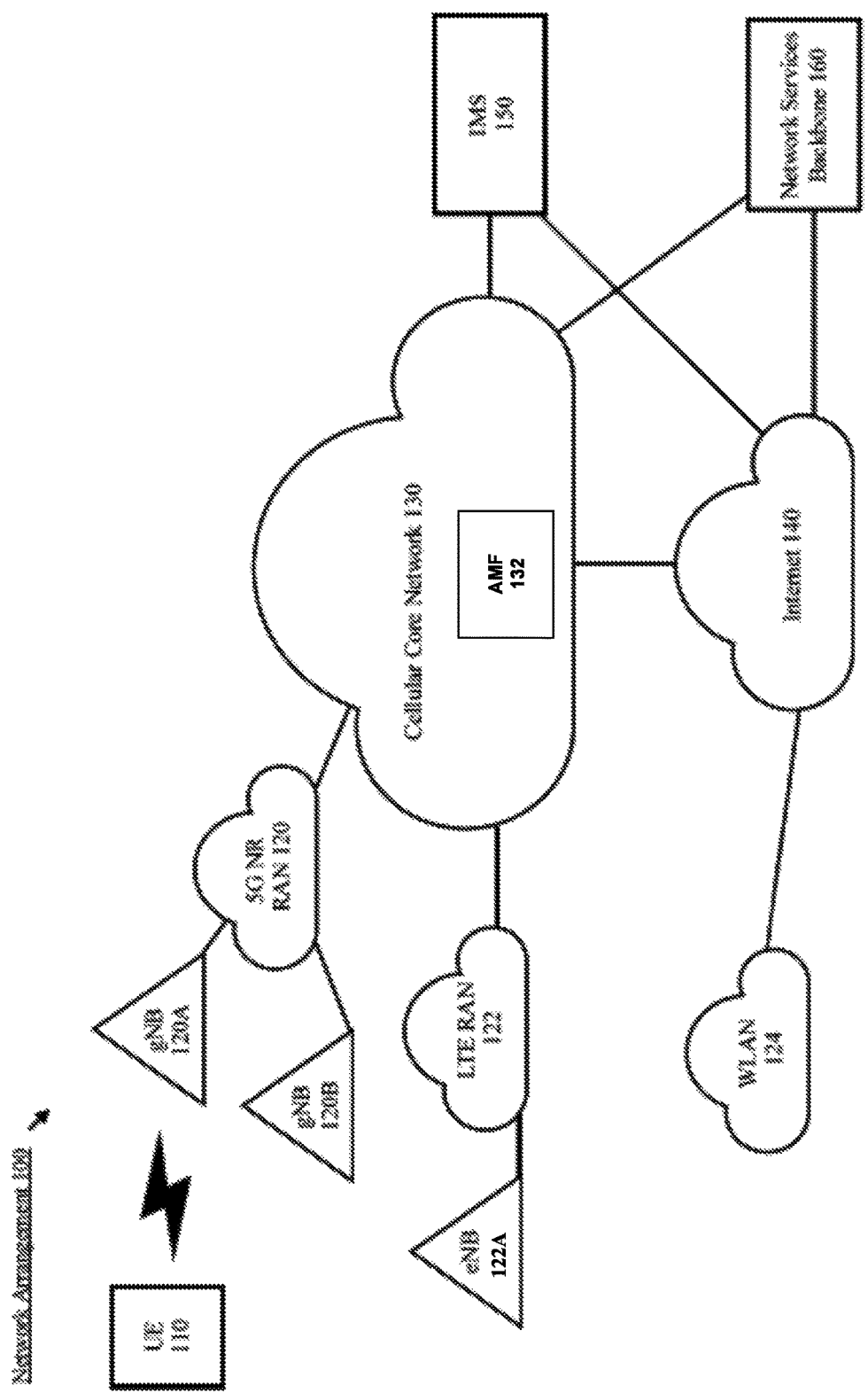
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to UE cell selection based on a mapping of network slices to frequency bands.

The exemplary embodiments are described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose. Throughout this description, reference to a network slice may represent any type of end-to-end logical network that is configured to serve a particular purpose and implemented on the 5G physical infrastructure.

A user equipment (UE) may be configured to utilize one or more network slices. To provide one example, the UE may utilize a first network slice for one or more carrier services (e.g., voice, multimedia messaging service (MMS), Internet, etc.) and a second different network slice for a third-party service. However, the configured purpose of a network slice is beyond the scope of the exemplary embodiments. The exemplary embodiments are not limited to any particular type of network slice.

A network slice may be identified by single network slice selection assistance information (S-NSSAI). Each S-NSSAI may be associated with a public land mobile network (PLMN) and may include the slice service type (SST) and a slice descriptor (SD). The SST may identify the expected behavior of the corresponding network slice with regard to services, features and characteristics. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

The UE may establish a session with a remote endpoint via the network connection. During the lifespan of the session, the network may perform a handover of the session from 5G to long-term evolution (LTE) or vice versa. For example, there may be scenarios in which the network is triggered to handover an evolved packet core (EPC) packet data network (PDN) session to the fifth generation core (5GC). To provide another example, there may be scenarios in which the network is triggered to handover a 5GC packet data unit (PDU) session to the EPC.

When a UE is in a location served by a base station (e.g., a next generation Node B (gNB)) that facilitates access to a first network slice but the UE also requires the services of a second network slice not available via the base station, the access and mobility management function (AMF) of the core network provides redirection information to the UE via the base station. Based on the redirection information, the UE performs a cell reselection to a cell that can facilitate access to the desired network slice.

The exemplary embodiments relate to providing a UE with a mapping of network slices available at a given location(s) to corresponding frequency bands on which those slices may be accessed. Based on this mapping, the UE may avoid unnecessary searching of frequencies on which a desired slice may not be accessed. As a result, power is saved at the UE and the UE may more quickly camp on a cell that facilitates access to the network slice that provides the desired services.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. In this example, the components include an access and mobility management function (AMF) 132. However, an actual cellular core network may include various other components performing any of a variety of different functions.

The AMF 132 performs operations related to mobility management such as, but not limited to, paging, non-access stratum (NAS) management and registration procedure management between the UE 110 and the cellular core network 130. Reference to a single AMF 132 is merely for illustrative purposes, an actual network arrangement may include any appropriate number of AMFs.

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
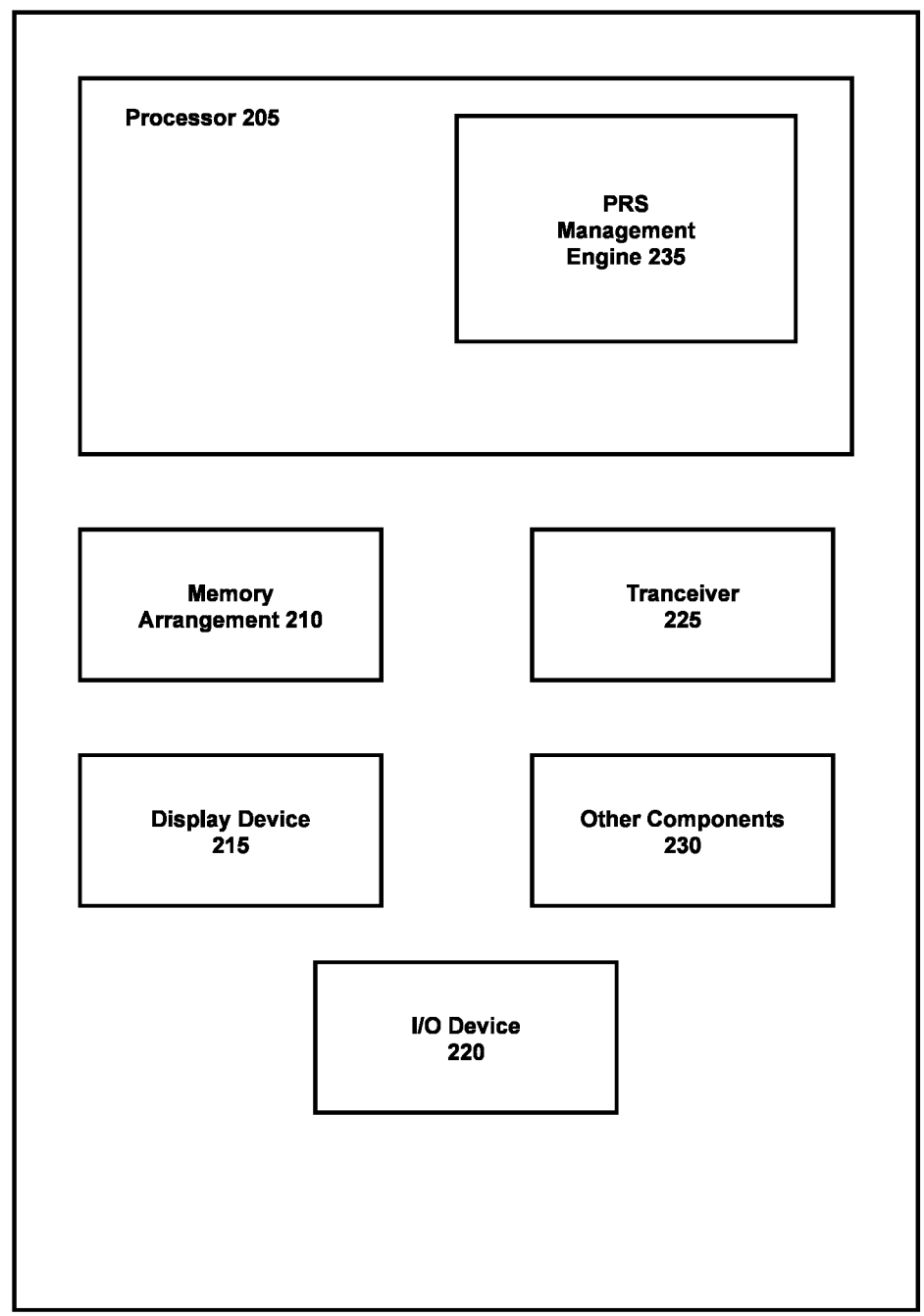
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a slice management engine 235. The slice management engine 235 may perform various operations related to camping on one or more cells depending on a network slice(s) supported by the cells. Exemplary operations performed by the slice management engine 235 will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
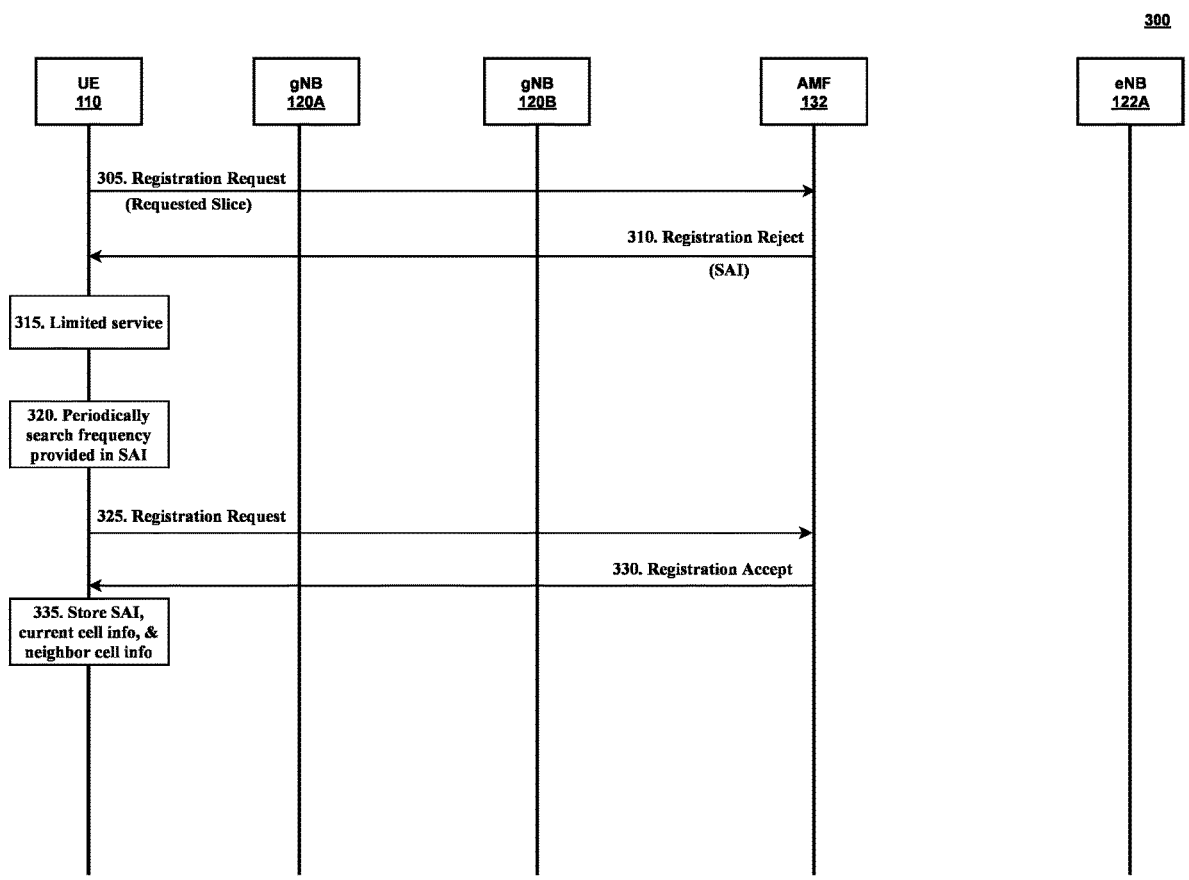
FIG. 3 shows an exemplary signaling diagram illustrating a method of determining on which network cell to camp based on a network slice configuration according to various exemplary embodiments.

FIG. 3 shows an exemplary signaling diagram 300 illustrating a method of determining on which network cell (served by a gNB) to camp based on a network slice configuration according to various exemplary embodiments. In the example of FIG. 3, it may be considered that the UE 110 is configured with (or allowed to access) only one preferred network slice and is initially camped on a first cell having a first frequency band (F1) served by a first gNB 120A and that access to the preferred network slice is not available in the first cell.

At 305, the UE transmits a registration request to the AMF 132 via a first gNB 120A including the requested slice in a S-NSSAI. Because the preferred network slice is not available in the first cell, at 310, the AMF 132 transmits a registration reject message to the UE 110 via the first gNB 120A and indicates the cause using, for example, cause #62 "No network slices available." The rejection also includes slice assistance information (SAI) indicating that the requested slice is available on a second frequency band (F2). At 315, the UE 110 remains camped on the first gNB 120A in limited service and performs a periodic search only on the frequency band (F2) indicated in the SAI Assuming the UE 110 finds a second cell (served by a second gNB 120B) on F2, at 325, the UE 110 transmits a registration request to the AMF 132 via the second gNB 120B. At 330, the AMF 132 transmits a registration accept message to the UE 110 via the second gNB 120B. At 335, the UE 110 stores the SAI received in the registration reject message at 310, the current cell information (first cell), and the neighboring cell information (second cell). This stored information allows the UE 110 to perform a more efficient cell search periodically or at power on in future instances.

In some embodiments, the UE 110 may alternatively camp on an LTE cell served by the eNB 122A upon receiving the registration reject message at 310. In some embodiments, the SAI received at 310 may also include the radio access technology (RAT) (e.g., NR or E-UTRA) which is included in an integrity and ciphered registration reject message.

In some embodiments, in the registration reject message at 310, the AMF 132 may indicate that the UE 110 is not permitted to obtain service on F1 throughout the current PLMN. As a result, the UE 110 may not select any cells on F1 for normal service operations. In such a scenario, the non-access stratum (NAS) indicates the barred frequency (e.g., F1) to the access stratum (AS), which in turn prevents selection of a cell with this frequency.

In some embodiments, if the registration rejection message at 310 indicates that the UE 110 does not have subscription to services (slices) which are deployed in a particular frequency, then the UE 110 will not attempt normal registration on any cell of that frequency in the same RAT and PLMN. The NAS layer indicates the barred frequency to AS, which in turn prevents selection of any cell on the same RAT deployed on the frequency. However, this barring can be cleared if the UE 110 receives an indication of a change in subscription, the UE 110 powers off then on, the universal subscriber identity module (USIM) is removed, etc. That is, any TAs or frequencies that were previously barred when the UE 110 requested a specific slice (e.g., at 305) can be unbarred if the UE 110 later changes the requested slice (e.g., due to a change in services needed on the UE 110).

Figure 4:
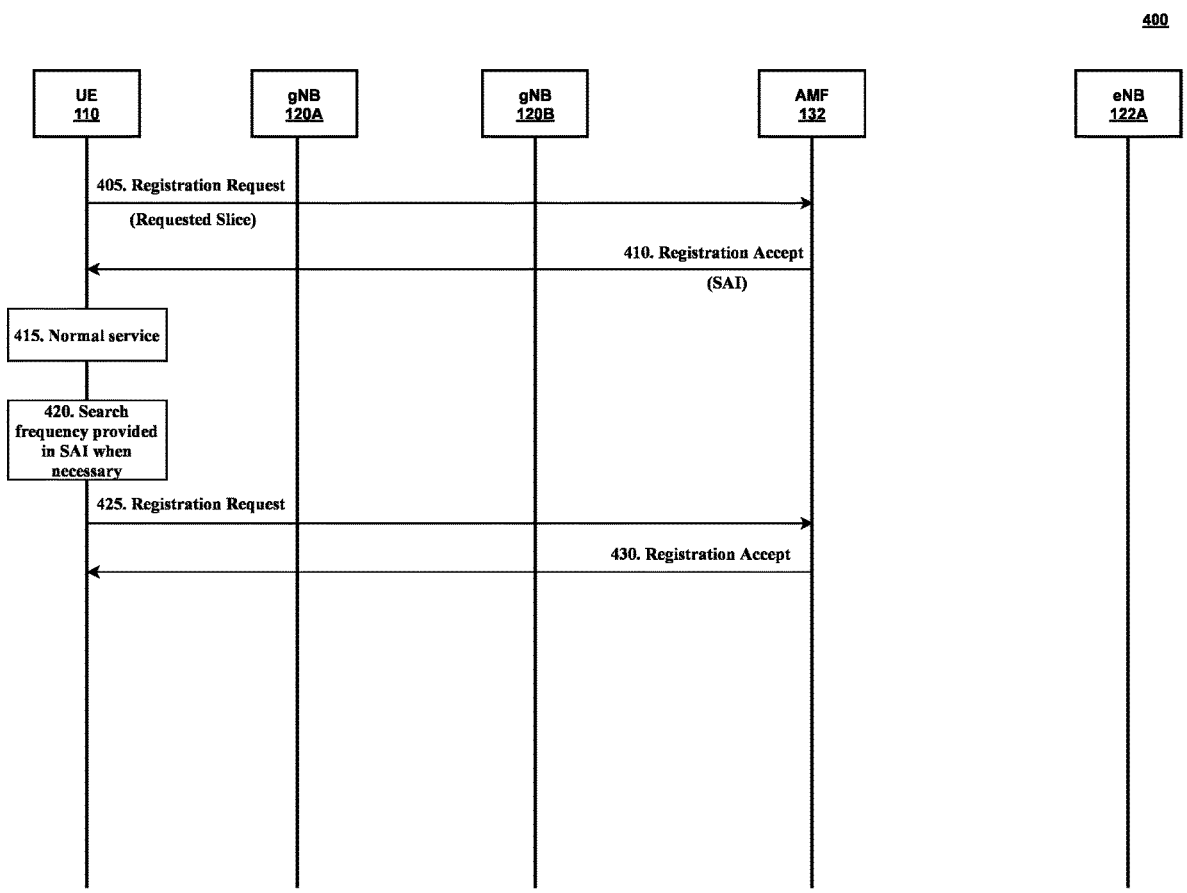
FIG. 4 shows an exemplary signaling diagram illustrating a method of determining on which network cell to camp based on a network slice configuration according to various exemplary embodiments.

FIG. 4 shows an exemplary signaling diagram illustrating a method of determining on which network cell to camp based on a network slice configuration according to various exemplary embodiments. In the example of FIG. 4, it may be considered that the UE 110 is configured with (allowed to access) a first preferred network slice and a second preferred network slice and is initially camped on a first cell having a first frequency band (F1) served by a first gNB 120A. It may also be considered that access to the first network slice is available on the first cell and access to the second network slice is not available on the first cell.

At 405, the UE transmits a registration request to the AMF 132 via the first gNB 120A including the requested slices in a NSSAI. Because the first slice is available and the second slice is not available in the first cell, at 410, the AMF 132 transmits a registration accept message to the UE 110 via the first gNB 120A. The registration accept message includes a list of allowed slices in an allowed S-NSSAI and an SAI indicating that the second slice is available on F2. At 415, the UE 110 remains camped on the first gNB 120A in normal service. When activating a protocol data unit (PDU) session, the UE 110 makes use of the information in the allowed S-NSSAI and the SAI by ensuring that it does not activate a PDU session when camped on a cell having a frequency different than that indicated in the SAI. At 420, the UE performs a search on the frequency indicated in the SAI (F2) when there is a need to activate the second slice. Assuming the UE 110 finds a second cell (served by a second gNB 120B) on F2, at 425, the UE 110 transmits a registration request to the AMF 132 via the second gNB 120B. At 430, the AMF 132 transmits a registration accept message to the UE 110 via the second gNB 120B.

In some embodiments, the SAI may also include the RAT (e.g., NR or E-UTRA) which may be sent to the UE 110 in the registration accept message or in a configuration update command (CUC) message. In some embodiments, when the UE 110 receives an indication from the network that a slice is deployed on a different frequency than the current camped one (e.g., in the SAI at 410), the UE 110 may periodically search for cells on that frequency if the currently registered slice is of lesser priority than the other slice for which the network sent the frequency information. In some embodiments, the UE 110 may prioritize the frequencies on which the network has indicated deployment of preferred slices for search at power up occasions. In addition to relying on indications provided by the network, in some embodiments, the UE 110 may additionally (a) use static information from its USIM which includes S-NSSAI along with the corresponding frequency band(s), and/or b) enhance UE route selection policy (URSP) to include frequency band information along with corresponding slice information that can be used by UE when performing a search for a particular slice. These additional resources help the UE 110 determine which slice(s) it needs to activate for which applications requesting data.

Figure 5:
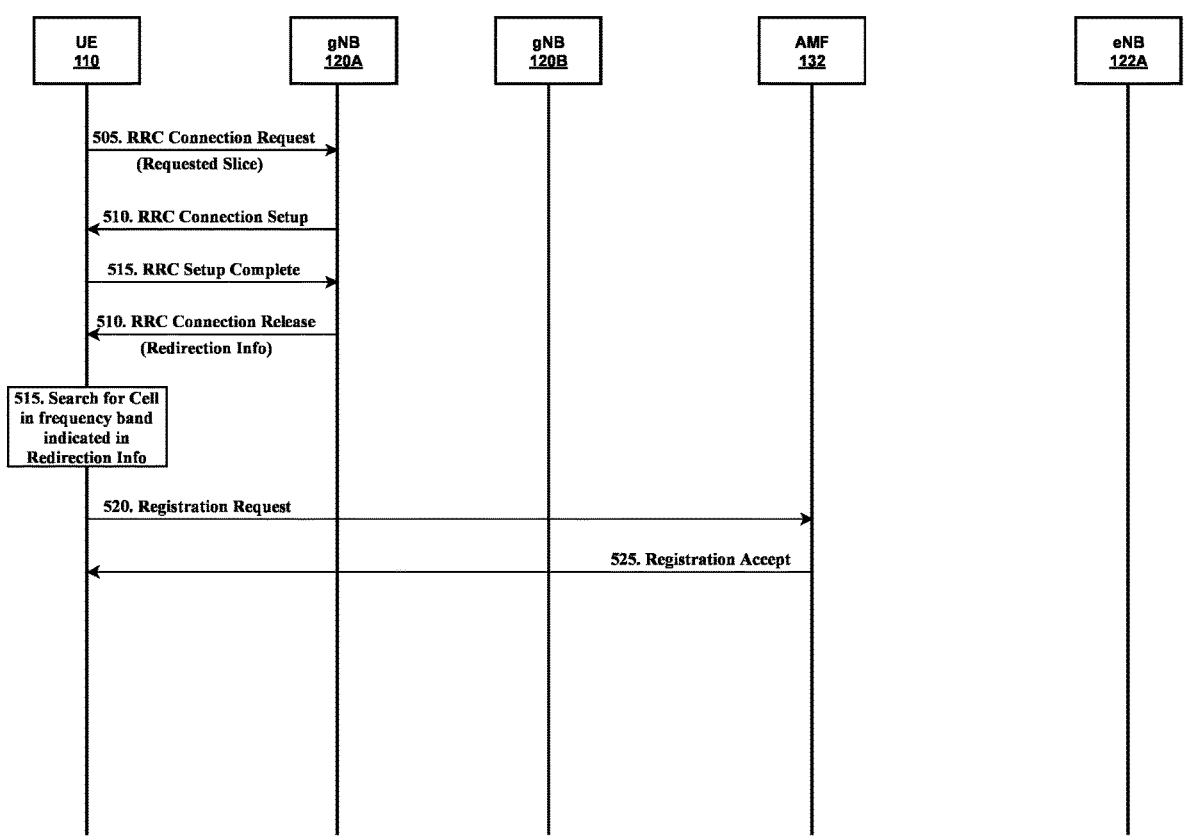
FIG. 5 shows an exemplary signaling diagram illustrating a method of determining on which network cell to camp based on a network slice configuration according to various exemplary embodiments.

FIG. 5 shows an exemplary signaling diagram 500 illustrating a method of determining on which network cell to camp based on a network slice configuration according to various exemplary embodiments. In the example of FIG. 5, it may be considered that the UE 110 is configured with (allowed to access) a preferred network slice and is permitted to include slice info in the RRCSetupComplete message with NSSAI inclusion mode set to A/B/C. It may also be considered that the UE 110 is initially camped on a first cell having a first frequency band (F1) served by a first gNB 120A and that access to the preferred network slice is not available in the first cell (on F1).

At 505, the UE 110 transmits a RRC connection request to the first gNB 120A including the requested slice (first network slice) in a S-NSSAI. The gNB 120A may be preconfigured with information indicating which network slices are deployed on the frequencies supported by the gNB 120A. Thus, the gNB 120A may know whether the desired slice is available at the gNB 120A and can respond to the UE 110 accordingly. In this example, since the desired slice is not available in the first cell, at 510, the first gNB 120A transmits an RRC release message to the UE 110 after receiving the RRCSetupComplete message from the UE 110 during the registration process. The RRC connection release message includes redirection information pertaining to the preferred slice if the preferred slice is accessible in an area with overlapping coverage (an area in which a first slice is accessible on F1 and the preferred slice is accessible on a second frequency band F2). In some embodiments, instead of the gNB 120A making the decision to release the UE 110 based on preconfigured information, the RRC connection release in 510 may be triggered by the AMF 132. Based on the redirection information or assistance information, the UE 110, at 515, performs a cell search to register on the new cell that supports the preferred slice. At 520, the UE 110 transmits a registration request to the AMF 132 via the second gNB 120B, which serves the second cell that supports the preferred slice. At 525, the AMF 132 transmits a registration accept message to the UE 110 via the gNB 120B. By transmitting the connection release message to the UE 110 immediately after the RRC Connection SetupComplete message (or by transmitting RRC connection Reject immediately a receiving the RRC Connection request), the network redirects the UE 110 earlier in time on than if it waited until after completion of the entire registration process.

Figure 6:
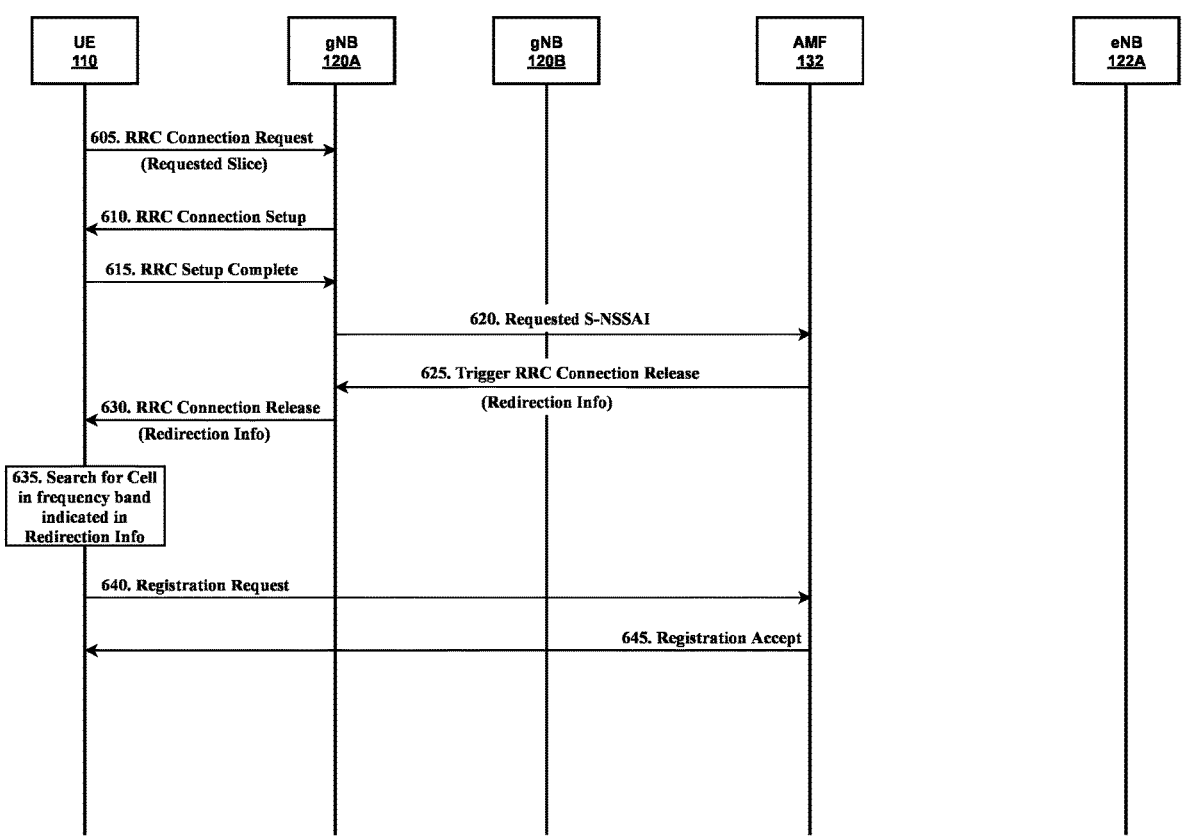
FIG. 6 shows an exemplary signaling diagram illustrating a method of determining on which network cell to camp based on a network slice configuration according to various exemplary embodiments.

FIG. 6 shows an exemplary signaling diagram 600 illustrating a method of determining on which network cell to camp based on a network slice configuration according to various exemplary embodiments. In the example of FIG. 6, it may be considered that the UE 110 is configured with (allowed to access) a preferred network slice and is initially camped on a first cell having a first frequency band (F1) served by a first gNB 120A and that access to the preferred network slice is not available in the first cell (on F1).

At 605, the UE 110 transmits a registration request to the first gNB 120A including the requested slice (first network slice) in a S-NSSAI. At 610, the first gNB 120A forwards the requested S-NSSAI to the AMF 132 that serves the first cell. Upon receiving the requested S-NSSAI, the AMF 132 determines that the UE 110 should be redirected because the desired slice is not available in the first cell. At 615 the AMF 132 triggers the first gNB 120A to transmit an RRC Connection Release with redirection information pertaining to the preferred slice if the preferred slice is accessible in an area with overlapping coverage (an area in which a first slice is accessible on F1 and the preferred slice is accessible on a second frequency band F2). At 620, the first gNB 120A transmits the RRC release message to the UE 110 having the redirection information. Based on the redirection information, the UE 110, at 625, performs a cell search to register on the new cell that supports the preferred slice. At 630, the UE 110 transmits a registration request to the AMF 132 via the second gNB 120B, which serves the second cell that supports the preferred slice. At 635, the AMF 132 transmits a registration accept message to the UE 110 via the second gNB 120B.

In some embodiments, if the UE 110 determines that the cause for the redirection is that a subset of the requested slices at 605 are not supported in the currently camped cell and the UE 110 has already received a registration accept for one or ones of the requested slices that are supported by the currently camped cell, then the UE 110 may determine whether or not it will honor the redirection based on a priority of applications that will access the requested slices. For example, if the UE 110 has more than 2 requested slices at 605 (e.g., slice A, B and C), and the AMF 132 determines that slice A and slice B are supported in F1 and slice C is supported in F2, the UE 110 may select whether or not it will honor a redirection to F2 for slice C services since doing so would cause loss of service for applications requiring slice A and/or B services.

Figure 7:
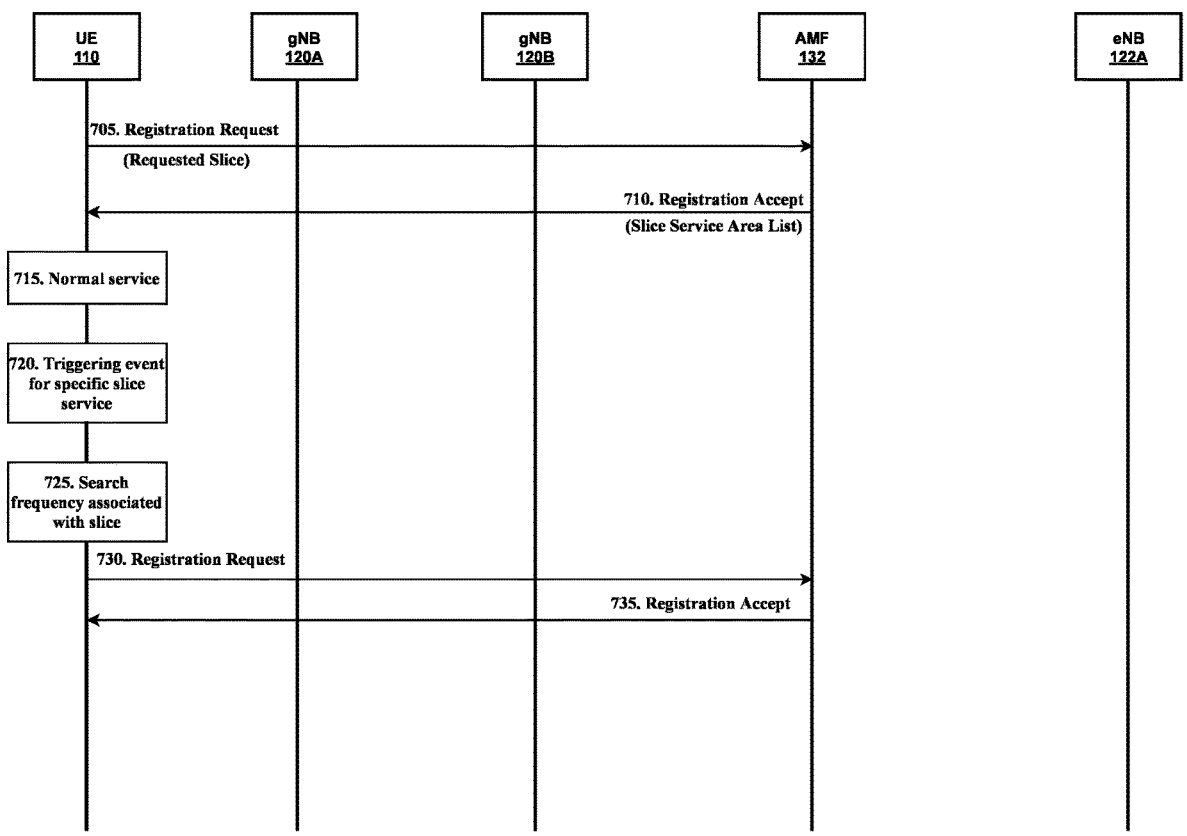
FIG. 7 shows an exemplary signaling diagram illustrating a method of determining on which network cell to camp based on a network slice configuration according to various exemplary embodiments.

FIG. 7 shows an exemplary signaling diagram 700 illustrating a method of determining on which network cell to camp based on a network slice configuration according to various exemplary embodiments. In the example of FIG. 7, it may be considered that the UE 110 is configured with (allowed to access) a first preferred network slice and a second preferred network slice and is initially camped on a first cell having a first frequency band (F1) served by a first gNB 120A. It may also be considered that access to the first network slice is available on the first cell and access to the second network slice is not available on the first cell.

At 705, the UE 110 transmits a registration request to the AMF 132 via the first gNB 120A including the requested slices in a NSSAI. Because the first slice is available and the second slice is not available in the first cell, at 710, the AMF 132 transmits a registration accept message to the UE 110 via the gNB 120A. The registration accept message includes a slice service area list that indicates in which tracking areas (TAs) of the UE's current registration area (RA) the UE 110 may find other slices and on which frequencies those slices may be accessed. For example, a slice service area list may provide the following indication: TA1: no mapping provided, TA2: Slice_N, F2, TA3: no mapping provided. Such a slice service area list implies that if the UE 110 is in TA2, the UE 110 can search for a cell on F2 to obtain slice N services. No mapping indicates that the corresponding TA provides services for all requested slices. In some embodiments, no mapping may also indicate that other slices are not available in the current location. This may allow the UE 110 to avoid searching for slices that are not mapped at the current TA.

At 715, the UE 110 remains camped on the first gNB 120A in normal service. At 720, the UE 110 performs a search on the frequency indicated in the SAI (F2) when there is a need to activate the second slice. Assuming the UE 110 finds a second cell (served by a second gNB 120B) on F2, at 725, the UE 110 transmits a registration request to the AMF 132 via the second gNB 120B. At 730, the AMF 132 transmits a registration accept message to the UE 110 via the gNB 120B.

Figure 8:
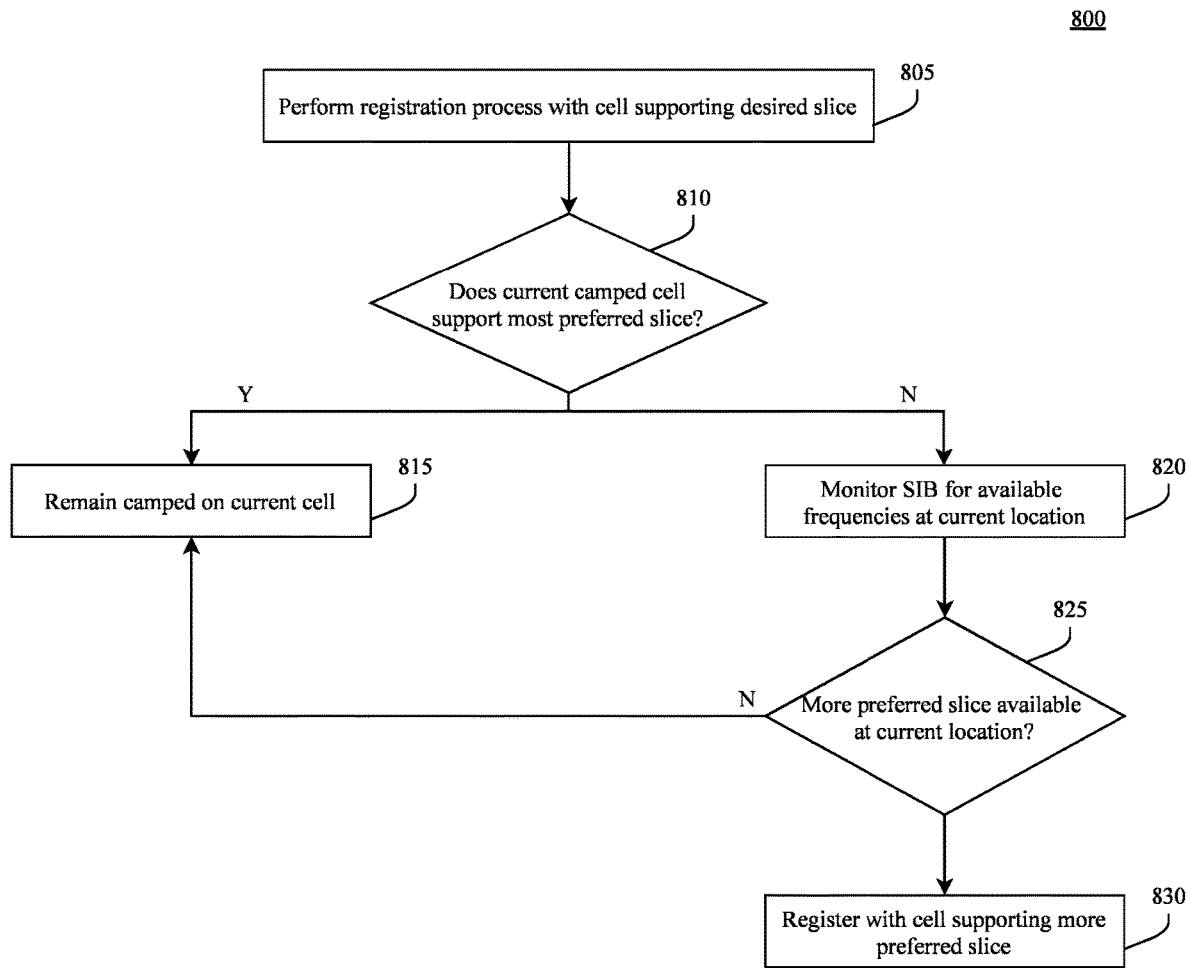
FIG. 8 shows an exemplary method of camping on cell having a frequency band associated with the most preferred network slice according to various exemplary embodiments.

FIG. 8 shows an exemplary method 800 of camping on a cell having a frequency band associated with the most preferred network slice according to various exemplary embodiments. At 805, the UE 110 registers with a cell supporting a preferred slice. Based on information provided by network (e.g., in a Registration accept message) or configured in USIM/URSP, the UE 110 is apprised of the association of frequencies with preferred slices. At 810, the UE 110 determines whether the current cell on which the UE 110 is camped supports the most preferred slice. If the current cell supports the most preferred slice, then at 815, the UE 110 remains camped on that cell.

However, if at 810 the UE 110 determines that the current cell does not support the most preferred slice, at 820, the UE 110 monitors a system information block (SIB) broadcast by the network which apprises the UE 110 of all available frequency bands available at the UE's current location. In some embodiments, the SIB may include a new information element (IE) that indicates the available frequencies associated with specific slices to enable the UE 110 to derive available slices and use that information for cell selection/re-selection. In some embodiments, the existing neighboring cell IE in the SIB may be used to provide such an indication.

Based on the known association of frequencies with preferred slices and the available frequency bands, the UE 110, at 825, determines if there is a more preferred slice available for access at the current location. If there is not a more preferred slice at the current location, then the method 800 proceeds to 815, where the UE 110 remains camped on the current cell. However, if there is a more preferred slice available at the current location, then, at 830, the UE 110 registers with the cell supporting the more preferred slice.

It should be noted that in the methods described above with respect to FIGS. 3-8, the UE 110 may camp and register on an LTE RAT if it is available in the UE's current location. In addition, the SAI may indicate if a slice is available in a frequency band for the entire PLMN or not. Such an SAI may include information such as, for example, a PLMN ID, the RAT, frequency band information, mapped S-NSSAI (if any), home PLMN (HPLMN) S-NSSAI, and a Boolean indicating whether a slice is supported in the frequency band in the entire PLMN or only available in specific TAs. For example, the SAI may use a boolean to indicate that an ultra reliable low latency communication (URLLC) slice is (a) available in the entire PLMN on a specific frequency band, or (b) available on a first frequency band in specific TAs and on a second frequency band in TAs. This boolean information assists the UE 110 in limiting the search for URLLC slice service to the specific frequency band (if the URLLC slice is available in the entire PLMN on that band) or barring the TAs where URLLC service is not available (provided the UE 110 is configured to use only URLLC slice service).

Based on the SAI information, the UE 110 can either consider the entire set of TAs provided in the registration area, the TA in which it has received a registration rejection (e.g., with cause #62 "No Network slice available" with subclause as "Slice Not available in current Registration Area"), or the entire frequency band as restricted for the requested slice. Further, the UE 110 may use the SAI information to stop reporting cells present in frequency bands on which it cannot find the respective slice service. In some embodiments, the UE 110 may alternatively consider the TA(s) on which the slice service is not available as forbidden TA(s).

Once the UE 110 changes the slice preference, the UE 110 deletes the forbidden TA list or begins reporting the frequency band cells which were restricted earlier.

Figure 9:
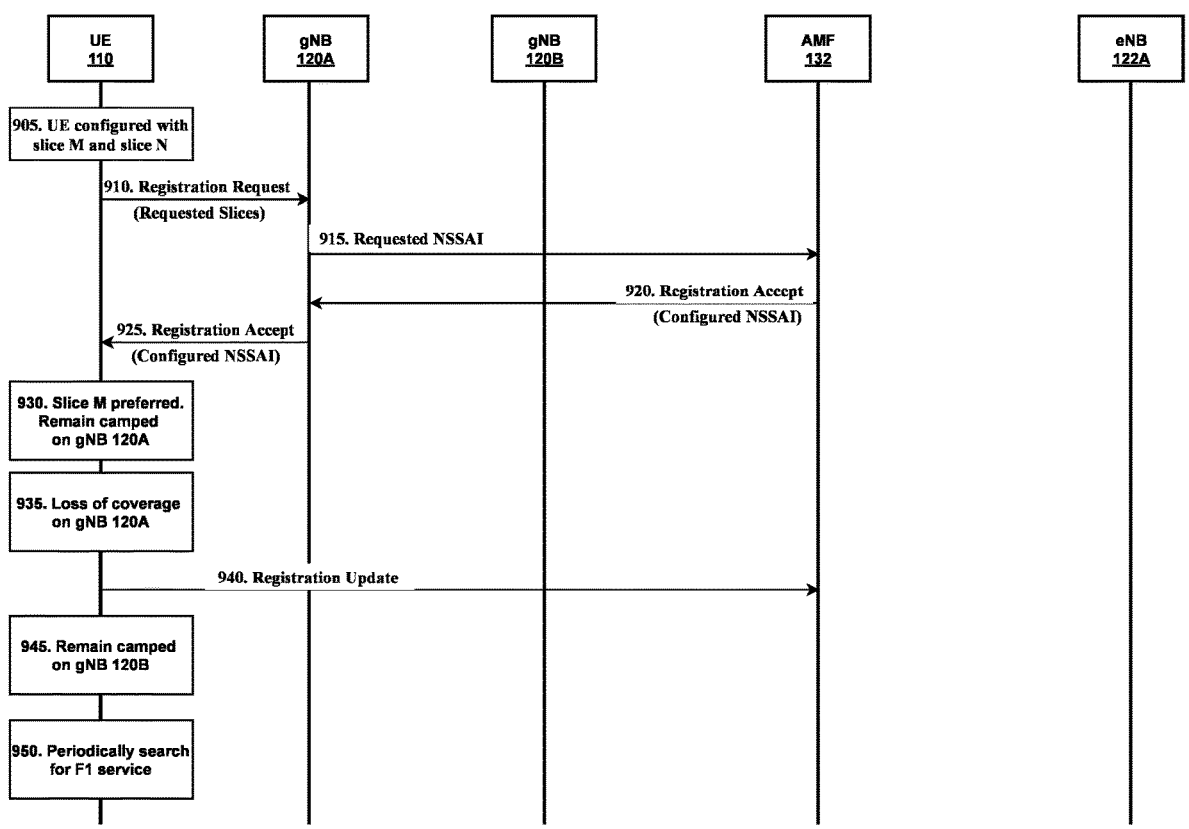
FIG. 9 shows an exemplary signaling diagram illustrating a method of determining on which network cell to camp during mobility and based on a network slice configuration according to various exemplary embodiments.

FIG. 9 shows an exemplary signaling diagram 900 illustrating a method of determining on which network cell to camp during mobility and based on a network slice configuration according to various exemplary embodiments. In the example of FIG. 9, it may be considered that, at 905, the UE 110 is configured with two slices M and N. It may also be considered that slice M is more preferred than slice N. It may further be considered that the first gNB 120A serving a first cell operates in a first frequency band F1 in a first TA (TA1) and the second gNB 120B serving a second cell operates in a second frequency band F2 in a second TA (TA2). Finally, it may be considered that the UE's current RA includes cells supporting F1 only in TA1.

At 910, the UE 110 transmits a registration request to the first gNB 120A. The registration request includes slices M and N as requested slices. At 915, the first gNB 120A forwards the requested NSSAI to the serving AMF 132. At 920, the AMF 132 transmits a registration accept with the configured NSSAI to the first gNB 120A. The configured NSSAI indicates the mapping of the two slices to frequencies on which those slices are supported. For example, the configured NSSAI may indicate slice M:F1 and slice N:F2.

At 925, the first gNB 120A transmits the registration accept message to the UE 110 including the configured NSSAI.

Because slice M is preferred, at 930, the UE 110 remains camped on the first gNB 120A. At 935, the UE 110 loses coverage on the first gNB 120A due to, for example, a mobility event. In the example of FIG. 9, it is considered that the UE 110 has moved from TA1 to TA2. As such, the UE 110 camps on the second gNB 120B and performs a registration update with the AMF 132 at 940. Since there is no F1 cell coverage in TA2, the network cannot redirect the UE 110 to an F1 cell that provides access to the more preferred slice M. As such, at 945, the UE 110 remains camped on the second gNB 120B. In some embodiments, the UE 110 may alternatively camp on an LTE cell (eNB 122A). Since slice M service is more preferred, at 950, the UE 110 periodically searches for service on F1 while remaining camped on the second gNB 120B. It should be noted that although one AMF 132 serves both slices (M and N), two separate AMFs may alternatively independently support the two slices.

Figure 10:
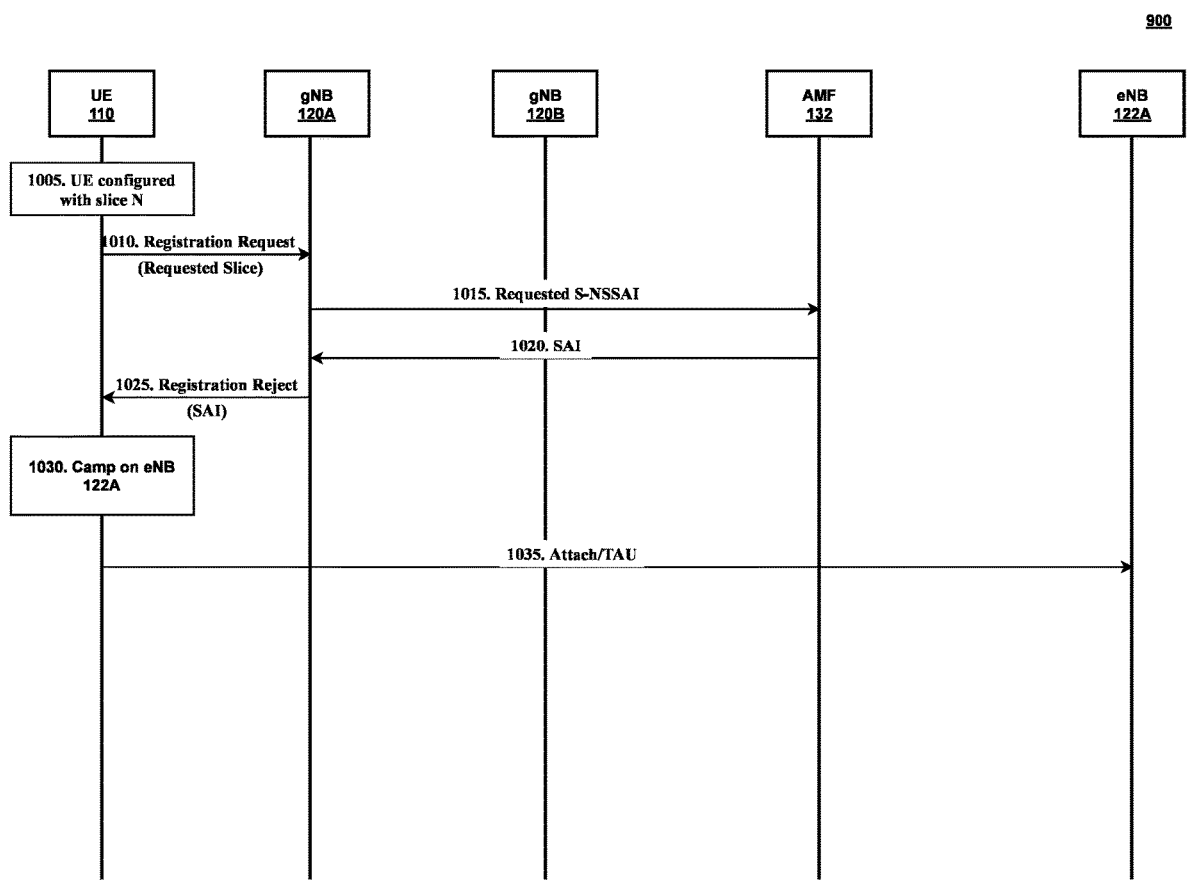
FIG. 10 shows an exemplary signaling diagram illustrating a method of determining on which network cell to camp during mobility and based on a network slice configuration according to various exemplary embodiments.

FIG. 10 shows an exemplary signaling diagram illustrating a method 1000 of determining on which network cell to camp during mobility and based on a network slice configuration according to various exemplary embodiments. In the example of FIG. 10, it may be considered that, at 1005, the UE 110 is configured with one slice N. It may also be considered that the first gNB 120A serving a first cell operates in a first frequency band F1 in a first TA (TA1) and the second gNB 120B serving a second cell operates in a second frequency band F2 in a second TA (TA2). It may further be considered that the AMF 132 only supports slice M service.

At 1010, the UE 110 transmits a registration request to the first gNB 120A. The registration request includes slice N as the requested slice. At 1015, the first gNB 120A forwards the requested S-NSSAI to the serving AMF 132. At 1020, the AMF 132 transmits the SAI to the first gNB 120A. The SAI indicates the mapping of slice N to the frequency on which it is supported and whether the frequency band (F2) is available in the entire PLMN or only in specific TAs. For example, the SAI may indicate slice N:F2 in a registration reject (e.g., with cause #62 "No Network slice available" with subclause as "Slice Not available in current Registration Area" or "Slice Not available in current frequency band"). In some embodiments, the AMF 132 may alternatively provide this information in configuration update command message indicating the current RA does not support slice N. At 1025, the first gNB 120A transmits a registration reject message to the UE 110 including the SAI.

Because slice N is more preferred, at 1030, the UE 110 camps on an LTE cell of the current PLMN served by eNB 122A. In some embodiments, however, if no suitable PLMN is found, the UE 110 may alternatively camp on the F1 cell served by the first gNB 120A and update the camped TA1 as forbidden based on the SAI. At 1035, the UE 110 performs an attach or tracking area update (TAU) procedure on LTE to register with the eNB 122A. In some embodiments, if the SAI indicates that slice N is not available on F2 in the entirety of the PLMN, the UE 110 may restrict camping on the F1 cell (the first gNB 120A) while remaining on the LTE cell unless there is a change in the UE slice subscription.

Figure 11:
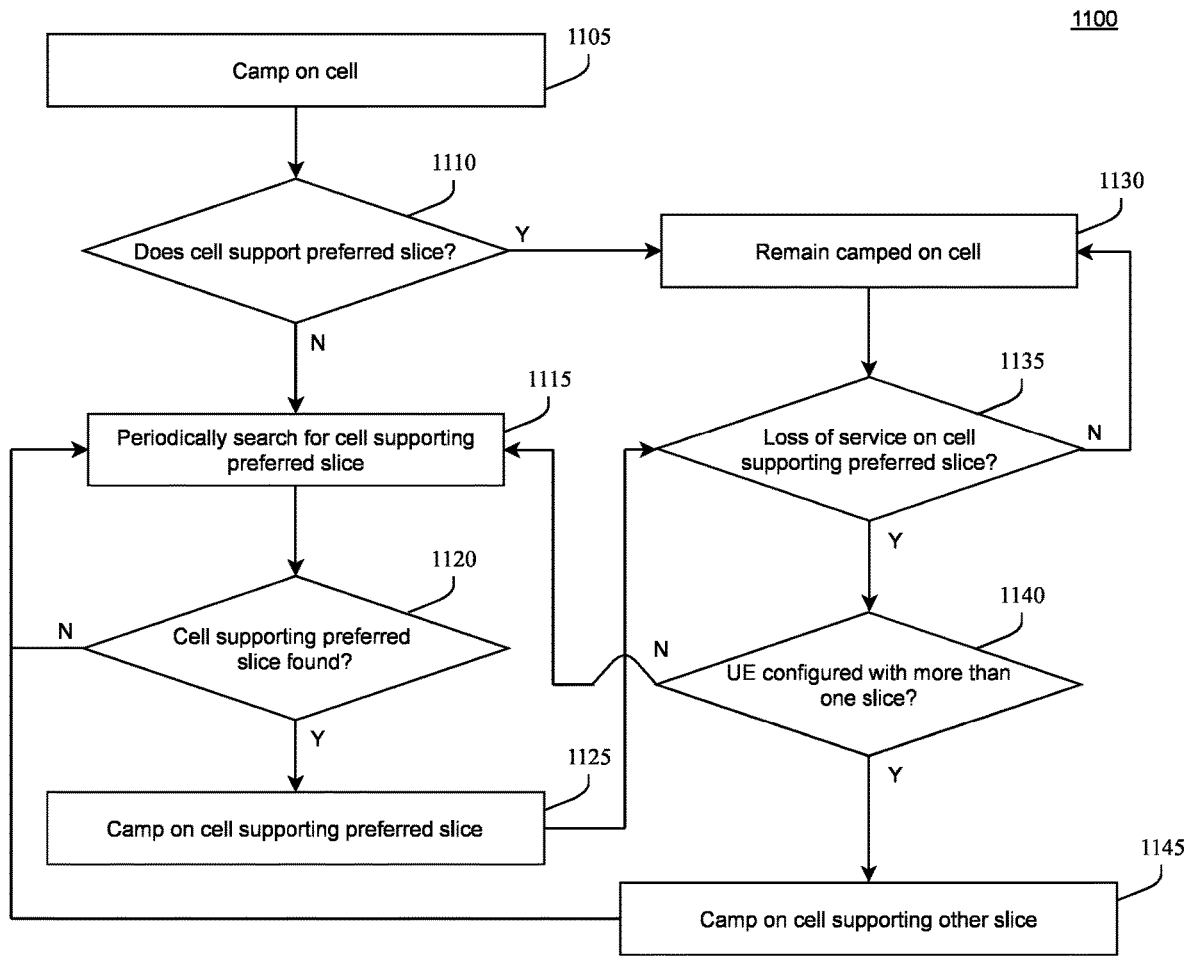
FIG. 11 shows an exemplary method of determining on which network cell to camp during mobility and based on a network slice configuration according to various exemplary embodiments.

FIG. 11 shows an exemplary method 1100 of determining on which network cell to camp during mobility and based on a network slice configuration according to various exemplary embodiments. At 1105, the UE 110 camps on a first cell, which supports a network slice. As explained above, the UE 110 is apprised of which slice the first cell supports during registration and on which frequency(ies) a preferred network slice(s) may be accessed. At 1110, the UE 110 determines whether the first cell supports a preferred slice with which the UE 110 is configured (based on the information provided by the network during registration on the first cell). If the first cell does not support the preferred network slice, then, at 1115, the UE 110 periodically searches for a second cell that supports the preferred slice (which the UE learns of based on information provided by the network during registration on the first cell) while remaining camped on the first cell. At 1120, the UE 110 determines whether a second cell that supports the preferred slice has been found. If a suitable cell has not been found, the method 1100 returns to 1115. In some embodiments, the UE 110 may alternatively camp on an LTE cell if a suitable cell is not found at 1120. If, however, a suitable cell is found at 1120, then, at 1125, the UE camps on the second cell that supports the preferred slice.

If, at 1110, the UE 110 determines that the first cell supports the preferred slice, then, at 1130, the UE 110 remains camped on the first cell. At 1135, the UE 110 determines if it has lost service on the first cell. If not, then the UE 110 continues to remain camped on the first cell at 1130. However, if the UE 110 loses service on the first cell at 1135, then, at 1140, the UE 110 determines if it is configured with more than one network slice. If the UE 110 is configured with more than one network slice, then, at 1145, the UE 110 camps on a second cell that supports the other (less preferred) slice. However, if the UE 110 is not configured with more than one slice, then the method 1100 returns to 1115. In some embodiments, the UE 110 may alternatively camp on an LTE cell if a suitable cell is not found at 1120.

Figure 12:
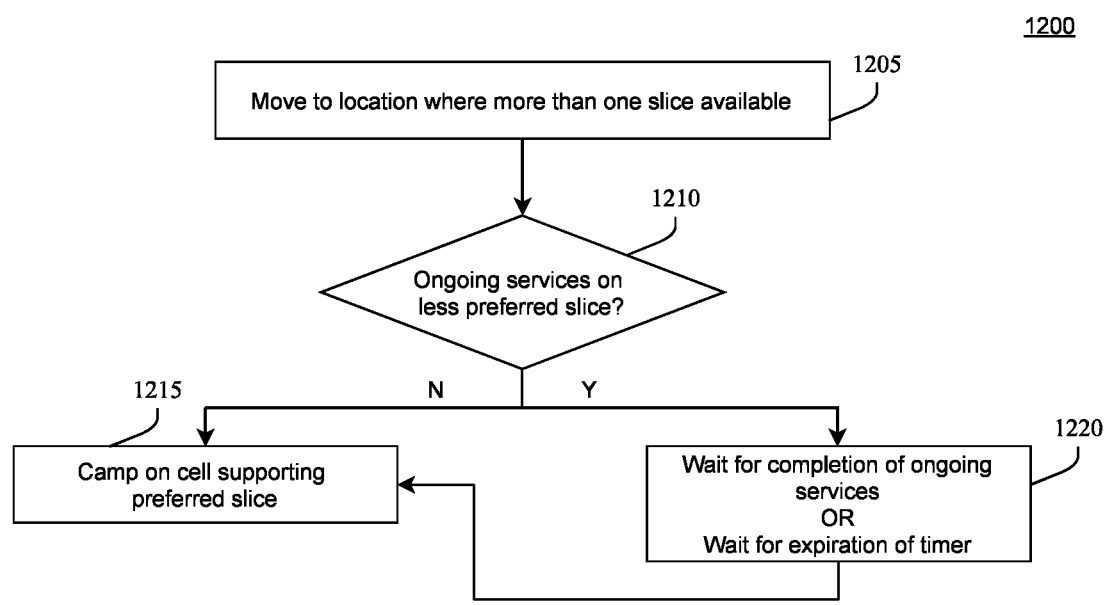
FIG. 12 shows an exemplary method of determining on which network cell to camp during mobility and based on a network slice configuration according to various exemplary embodiments.

FIG. 12 shows an exemplary method 1200 of determining on which network cell to camp during mobility and based on a network slice configuration according to various exemplary embodiments. The method 1200 assumes that the UE 110 is configured with a first slice and a second slice, with the first slice being the preferred slice. At 1205, the UE 110 moves from a first location where only the second slice is available to a second location where both the first and second slices are available. At 1210, the UE 110 determines whether there are ongoing services on the less preferred slice. If there are no ongoing services on the less preferred slice, then, at 1215, the UE 110 camps on the cell that supports the preferred slice (the first slice). However, if there are ongoing services on the less preferred slice, then, at 1220, the UE 110 waits for completion of the ongoing services or waits for the expiration of a timer before camping on the cell supporting the preferred slice at 1215.

Figure 13A:
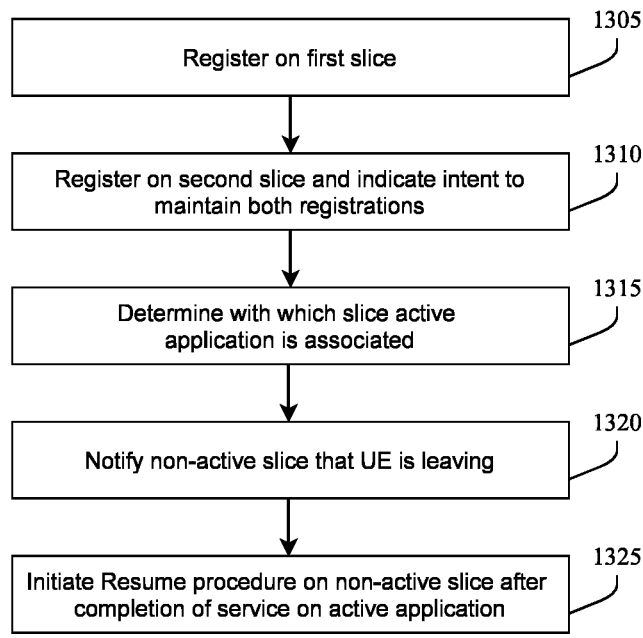
FIG. 13A shows an exemplary method of handling disjoint network slices according to various exemplary embodiments.

FIG. 13A shows an exemplary method 1300 of handling disjoint network slices according to various exemplary embodiments. In the example of the method 1300, it may be considered that the UE 110 is in a location that supports two slices that are deployed as disjointed. That is, access to services provided by the two slices are mutually exclusive. One registration will not provide the UE 110 with access to both slices. It may also be considered that two slices are available at the current location and that they are disjointed.

At 1305, the UE 110 registers on the first slice via registration on a first cell. At 1310, the UE 110 registers on the second slice via registration on a second cell and indicates on the registration its intent to maintain both registrations. This intent will be forwarded to the home subscriber server (HSS) so that it does not delete the UE context for the registration done from the first cell. As a result, the UE 110 is concurrently registered through the first and second cells and has two contexts maintained simultaneously in the network.

At 1315, the UE 110 determines with which slice (e.g., first slice) an active application on the UE is associated. At 1320, the UE notifies the cell of the non-active slice (e.g., second slice) that the UE is leaving. In some embodiments, the UE 110 may also set paging filters for the services of the non-active slice for which the UE 110 needs to be paged. Once the UE's usage of the active slice's services have finished, the UE 110, at 1125, initiates a resume procedure on the non-active slice to resume, for example, mobile terminated (MT) service on the non-active slice. In some embodiments, the UE 110 may also clear any paging filters.

Figure 13B:
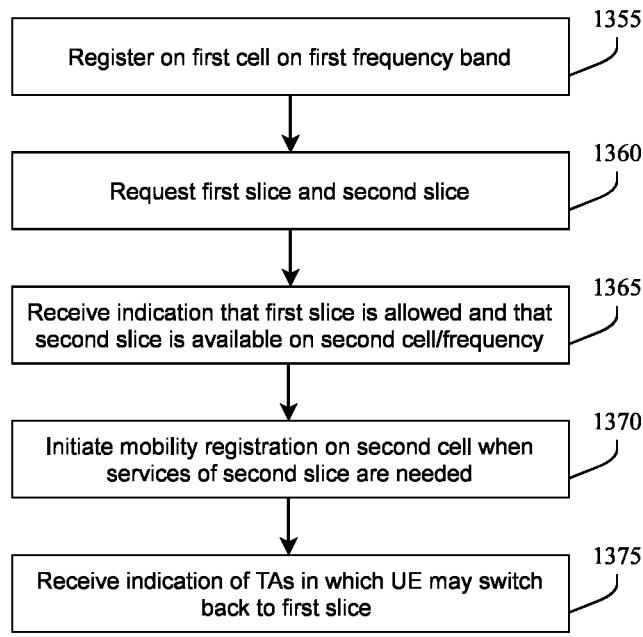
FIG. 13B shows an exemplary method of handling disjoint network slices according to various exemplary embodiments.

FIG. 13B shows an exemplary method 1350 of handling disjoint network slices according to various exemplary embodiments. In the example of the method 1350, it may be considered that the UE 110 is in a location that supports two slices that are deployed as disjointed. That is, access to services provided by the two slices are mutually exclusive. One registration will not provide the UE 110 with access to both slices. It may also be considered that two slices are available at the current location and that they are disjointed.

At 1355, the UE 110 registers on a first cell in a first frequency band (F1) and in a first TA (TA1). At 1360, the UE 110 requests the first slice and the second slice in the NSSAI during registration. At 1365, the UE 110 receives an indication from the network that the first slice is allowed and that the second slice is available on a second cell/frequency band. In some embodiments, the UE 110 may also receive a list of tracking areas where the second slice is available. At 1370, the UE initiates a mobility registration on the second cell/frequency when the services of the second slice are needed. At 1375, the UE 110 receives an indication from the network if the TAs in which the UE 110 switch back to the first slice on demand.

Figure 14:
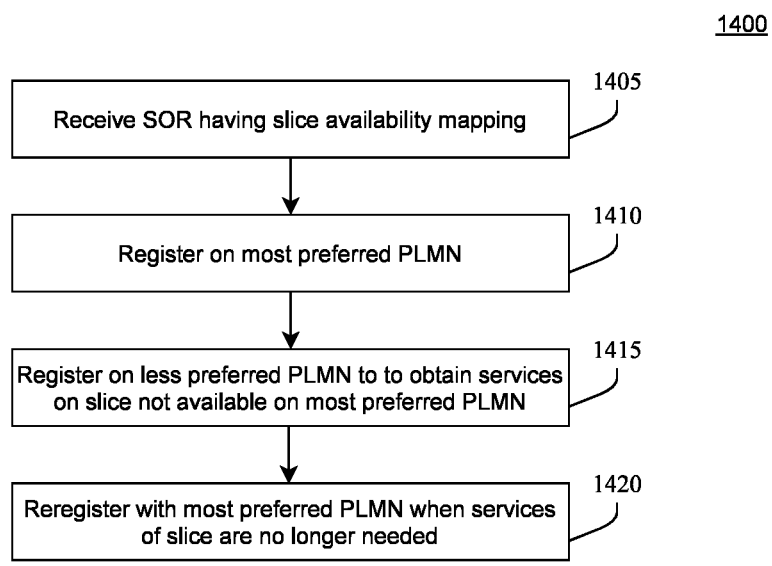
FIG. 14 shows an exemplary method of determining on which public land mobile network (PLMN) to camp based on a network slice configuration according to various exemplary embodiments.

FIG. 14 shows an exemplary method 1400 of determining on which PLMN to camp based on a network slice configuration according to various exemplary embodiments. In the example of the method 1400, it may be considered that, while the UE 110 is roaming, the most preferred VPLMN configured by the HPLMN does not support all of the slices needed by the UE 110 and that a less preferred VPLMN supports the slice(s) not supported by the most preferred VPLMN.

At 1405, the UE 110 receives a steering of roaming (SOR) which includes slice availability mapping to the PLMNs in the SOR list. That is, the SOR list includes information of the slices supported by the PLMNs on NR RAT. At 1410, the UE 110 registers on the most preferred PLMN. If the UE 110 needs to access services if a slice not supported by the most preferred PLMN, then at 1415, the UE 110 uses the slice association in the SOR to do a PLMN selection and register on a less preferred VPLMN for the duration of time that the services are needed. After completion of the session, the UE 110, at 1420, reregisters with the most preferred PLMN. In some embodiments, the reregistration on the most preferred PLMN may alternatively be based on the expiration of a timer. In some embodiments, if more than one PLMN supports the slice not supported by the most preferred PLMN, then the UE 110 may consider the earlier entry in the operation PLMN (OPLMN)/user PLMN (UPLMN) list as the more preferred PLMN for that slice and does the PLMN selection accordingly.

In some embodiments, the network may broadcast the supported slices as part of the broadcast information (SIB) and the UE 110 uses the information in the broadcast to decide which PLMN to select based on specific slices.

In some embodiments, when the UE 110 tries to register on the less preferred PLMN at 1415, if that PLMN rejects the registration, it may provide the PLMN ID of another PLMN that may support the service needed by the UE 110. Based on this information, the UE 110 registers on the indicated PLMN (at 1415).

In some embodiments, if the UE 110 supports registration via both 3GPP access and non 3GPP access, the UE 110 may use a PDN connection of the currently registered PLMN (the most preferred PLMN) on 3GPP access for Non 3GPP Inter Working Function (N3IWF) selection and access the less preferred VPLMN as though it were non-3GPP access. Here, the 3GPP registration and active 3GPP PDU session is considered as non-3GPP access to access the VPLMN. As a result, the UE 110 has access to the most preferred VPLMN and its services and is also able to access services of the slice not supported by the most preferred PLMN, but supported by the less preferred PLMN.

EXAMPLES

In a first example, a processor of a user equipment (UE) is configured to perform operations comprising transmitting a registration request to a first base station of a cellular wireless network, wherein the first base station operates on a first frequency band, the registration request including a first indication of one or more preferred network slices, receiving a registration response from the first base station, the registration response including (i) a second indication of whether the one or more preferred network slices are accessible on the first frequency band and (ii) a third indication of where the UE can access any unsupported one or ones of the one or more preferred network slices.

In a second example, the processor of the first example, wherein the one or more network slices includes a plurality of network slices, wherein the first base station serves a most preferred PLMN, wherein the first base station provides access to a subset of the plurality of network slices.

In a third example, the processor of the second example, wherein the operations further comprise registering on second base station of a less preferred PLMN to obtain services on another network slice not in the subset of the plurality of network slices supported by the first base station when the services of the other network slice are needed.

In a fourth example, the processor of the second example, wherein the operations further comprise receiving a broadcast from the 5G NR wireless network indicating supported network slices, and determining on which PLMN to register based on the supported network slices indicated in the broadcast.

In a fifth example, the processor of the second example, wherein the operations further comprise transmitting a registration request on a second base station of a less preferred PLMN to obtain services on another network slice not in the subset of the plurality of network slices supported by the first base station, receiving a registration rejection from the second base station, wherein the registration rejection includes a PLMN ID of a third PLMN on which the other network slice may be accessed and registering with the third PLMN to obtain services on the network slice not in the subset of the plurality of network slices supported by the first base station.

In a sixth example, the processor of the second example, wherein the operations further comprise utilizing a packet data network (PDN) connection of the connection with the first PLMN on 3$^{rd}$ generation partnership project (3GPP) access for non 3GPP inter working function (N3IWF) to select and access a second PLMN to obtain services on another network slice not in the subset of the plurality of network slices supported by the first base station.

In a seventh example, the processor of the first example, wherein the one or more network slices is one preferred network slice, wherein the one preferred network slice is not accessible on the first frequency band associated with the first base station, wherein the registration response is a connection release, and wherein the third indication includes redirection information indicating that the one preferred network slice may be accessed on a second cell.

In an eighth example, the processor of the seventh example, wherein the operations further comprise determining a cause of the connection release, wherein registration is successful for one or more of the requested slices and when the cause is due to a subset of requested slices being available on a different frequency band, determining whether to follow the redirection information or to remain camped on the first base station.

In a ninth example, a network function is configured to perform operations comprising receiving a registration request, from a user equipment (UE), comprising a first indication of one or more preferred network slices on a first frequency band and sending a registration response including (i) a second indication of whether the one or more preferred network slices are accessible on the first frequency band and (ii) a third indication of where the UE can access any unsupported one or ones of the one or more preferred network slices.

In a tenth example, the network function of the ninth example, wherein the one or more network slices is one preferred network slice, wherein the one preferred network slice is not accessible on the first frequency band associated with the first base station, wherein the registration response is a registration reject, and wherein the third indication is slice assistance information (SAI) including a mapping of the one preferred network slice to a second frequency band on which the one preferred slice may be accessed.

In an eleventh example, the network function of the ninth example, wherein the one or more network slices includes a more preferred network slice and a less preferred network slice, wherein the one of the more preferred network slice or less preferred network slice may be accessed on the first frequency band associated with the first base station, wherein the registration response is a registration accept, wherein the third indication is SAI indicating a mapping of the other one of the more preferred network slice or less preferred network slice to a second frequency band on which it may be accessed.

In a twelfth example, the network function of the ninth example, wherein the one or more network slices is one preferred network slice, wherein the one preferred network slice is not accessible on the first frequency band associated with the first base station, wherein the registration response is a connection release, and wherein the third indication includes redirection information indicating that the one preferred network slice may be accessed on a second cell.

In a thirteenth example, the network function of the ninth example, wherein the one or more network slices includes a more preferred network slice and a less preferred network slice, wherein the one or the more preferred network slice or less preferred network slice may be accessed on the first frequency band associated with the first base station, wherein the registration response is a registration accept, wherein the third indication is a slice service area list indicating a list of tracking areas (TAs) and network slices that may be accessed in the TAs.

In a fourteenth example, the network function of the ninth example, wherein the third indication is SAI that indicates whether the one or more preferred network slices are available in a frequency band in an entirety of a current PLMN or in specific TAs of the current PLMN.

In a fifteenth example, the network function of the ninth example, wherein the one or more network slices include a first network slice and a second network slice, wherein the first and second network slices are disjointed, wherein the first base station provides access to the first network slice on the first frequency band; and wherein the operations further comprise receiving a second registration request comprising an indication that the UE intends to remain registered on a first base station concurrently with being registered on the second base station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

We claim:

1. A processor of a user equipment (UE) configured to perform operations comprising:
   transmitting a registration request to a first base station of a cellular wireless network, wherein the first base station operates on a first frequency band, the registration request including a first indication of one or more preferred network slices; and
   receiving a registration response from the first base station, the registration response including (i) a second indication of whether the one or more preferred network slices are accessible on the first frequency band and (ii) a third indication of where the UE can access any unsupported one or ones of the one or more preferred network slices.

2. The processor of claim 1, wherein the one or more network slices is one preferred network slice, wherein the one preferred network slice is not accessible on the first frequency band associated with the first base station, wherein the registration response is a registration reject, and wherein the third indication is slice assistance information (SAI) including a mapping of the one preferred network slice to a second frequency band on which the one preferred slice may be accessed.

3. The processor of claim 2, wherein the operations further comprise:
periodically searching for a second cell on the second frequency band to access the one preferred network slice.

4. The processor of claim 2, wherein the operations further comprise:
barring any future registration on any cell in the first frequency band in a current radio access technology (RAT) and public land mobile network (PLMN) unless a network slice subscription change occurs in the UE.

5. The processor of claim 2, wherein the operations further comprise:
camping on a long term evolution (LTE) cell; and
barring any future registration for accessing normal services on any cell in the first frequency band.

6. The processor of claim 1, wherein the one or more network slices includes a more preferred network slice and a less preferred network slice, wherein the one of the more preferred network slice or less preferred network slice may be accessed on the first frequency band associated with the first base station, wherein the registration response is a registration accept, wherein the third indication is SAI indicating a mapping of the other one of the more preferred network slice or less preferred network slice to a second frequency band on which it may be accessed.

7. The processor of claim 6, wherein when the more preferred network slice may be accessed on the first frequency band, the operations further comprise:
remaining camped on a first cell served by the first base station.

8. The processor of claim 7, wherein when the UE moves outside of a coverage area of the first base station causing loss of access to the more preferred slice, the operations further comprise:
camping on a second cell on the second frequency band; and
periodically searching for a cell on the first frequency band to obtain services on the more preferred network slice again.

9. The processor of claim 1, wherein the one or more network slices is one preferred network slice, wherein the one preferred network slice is not accessible on the first frequency band associated with the first base station, wherein the registration response is a connection release, and wherein the third indication includes redirection information indicating that the one preferred network slice may be accessed on a second cell.

10. The processor of claim 1, wherein the one or more network slices includes a more preferred network slice and a less preferred network slice, wherein the one or more preferred network slice or less preferred network slice may be accessed on the first frequency band associated with the first base station, wherein the registration response is a registration accept, wherein the third indication is a slice service area list indicating a list of tracking areas (TAs) and network slices that may be accessed in the TAs.

11. The processor of claim 1, wherein the one or more network slices includes a more preferred network slice and a less preferred network slice, wherein when the UE moves from a first location where only the less preferred network slice is accessible to a second location where the more preferred network slice and less preferred network slice are both accessible, the operations further comprise:
receiving an indication that the more preferred network slice is available at the second location; and
switching to the more preferred network slice upon expiration of a timer.

12. The processor of claim 1, wherein the one or more network slices includes a plurality of network slices, wherein the first base station serves a most preferred PLMN, wherein the first base station provides access to a subset of the plurality of network slices.

13. The processor of claim 12, wherein the operations further comprise:
registering on second base station of a less preferred PLMN to obtain services on another network slice not in the subset of the plurality of network slices supported by the first base station when the services of the other network slice are needed.

14. The processor of claim 12, wherein the operations further comprise:
receiving a broadcast from a 5G NR wireless network indicating supported network slices; and
determining on which PLMN to register based on the supported network slices indicated in the broadcast.

15. The processor of claim 12, wherein the operations further comprise:
transmitting a registration request on a second base station of a less preferred PLMN to obtain services on another network slice not in the subset of the plurality of network slices supported by the first base station;
receiving a registration rejection from the second base station, wherein the registration rejection includes a PLMN ID of a third PLMN on which the other network slice may be accessed; and
registering with the third PLMN to obtain services on the network slice not in the subset of the plurality of network slices supported by the first base station.

16. The processor of claim 12, wherein the operations further comprise:
utilizing a packet data network (PDN) connection of the connection with the first PLMN on $3^{rd}$ generation partnership project (3GPP) access for non 3GPP inter working function (N3IWF) to select and access a second PLMN to obtain services on another network slice not in the subset of the plurality of network slices supported by the first base station.

17. The processor of claim 1, wherein the one or more network slices is one preferred network slice, wherein the one preferred network slice is not accessible on the first frequency band associated with the first base station, wherein the registration response is a connection release, and wherein the third indication includes redirection information indicating that the one preferred network slice may be accessed on a second cell.

18. The processor of claim 17, wherein the operations further comprise:
determining a cause of the connection release, wherein registration is successful for one or more of the requested slices and when the cause is due to a subset of requested slices being available on a different frequency band; and determining whether to follow the redirection information or to remain camped on the first base station.

19. A user equipment (UE), comprising:
a transceiver configured to communicate with a cellular wireless network; and
a processor communicatively coupled to the transceiver and configured to perform operations comprising:
  transmitting a registration request to a first base station of the cellular wireless network, wherein the first base station operates on a first frequency band, the registration request including a first indication of one or more preferred network slices; and
  receiving a registration response from the first base station, the registration response including (i) a second indication of whether the one or more preferred network slices are accessible on the first frequency band and (ii) a third indication of where the UE can access any unsupported one or ones of the one or more preferred network slices.

* * * * *